Figure 4:
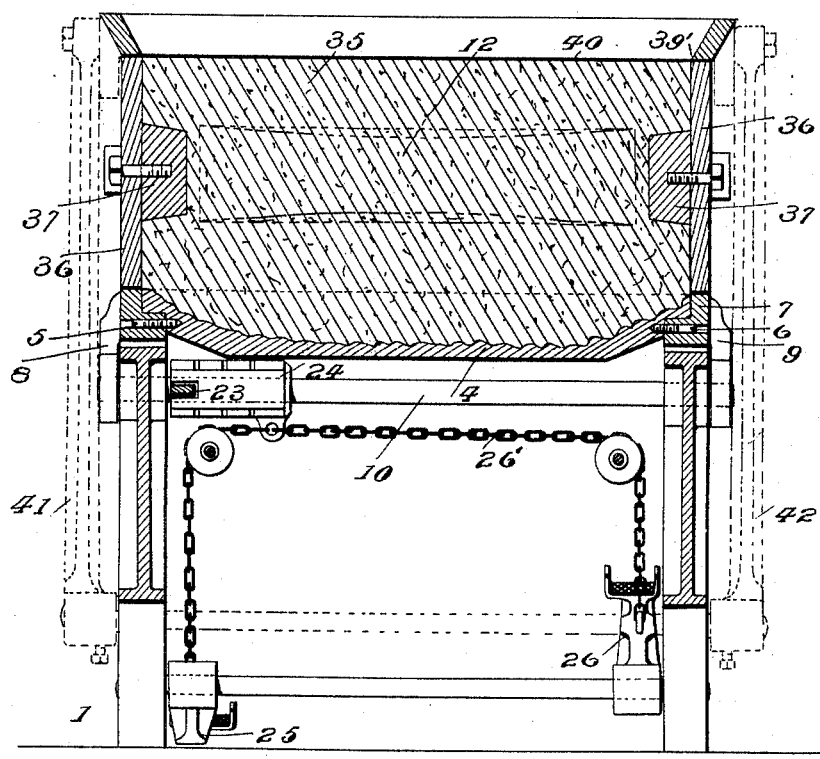

No. 776,137. PATENTED NOV. 29, 1904.
J. W. JACKSON.
MACHINE FOR MOLDING BUILDING BLOCKS.
APPLICATION FILED AUG. 10, 1904.
NO MODEL. 4 SHEETS—SHEET 1.
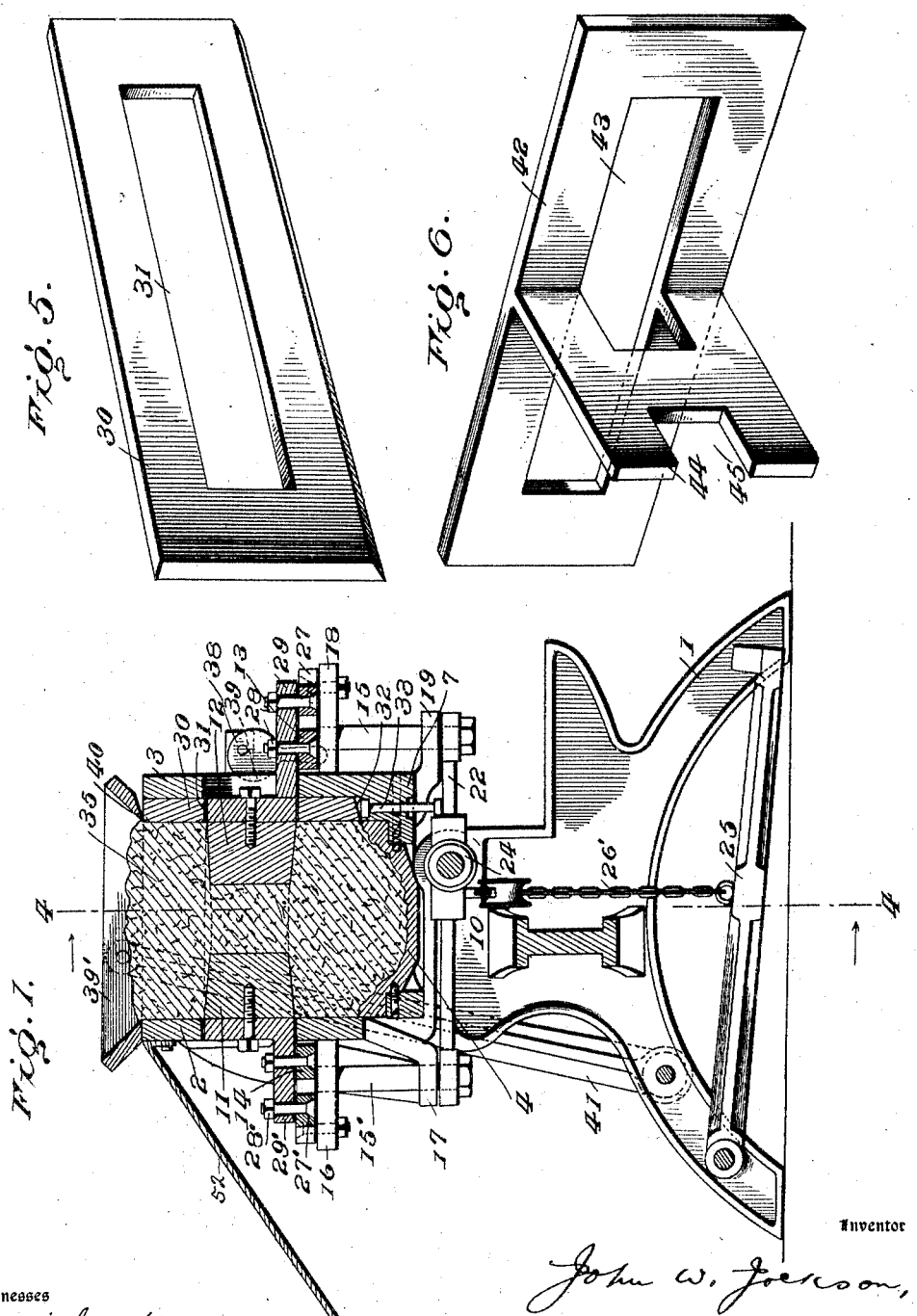
Witnesses
Frederick A. Holton
Wm. B. Kerkam
Inventor
John W. Jackson,
By
Mauro, Cameron, Lewis & Massie,
Attorneys.

No. 776,137. PATENTED NOV. 29, 1904.
J. W. JACKSON.
MACHINE FOR MOLDING BUILDING BLOCKS.
APPLICATION FILED AUG. 10, 1904.
NO MODEL. 4 SHEETS—SHEET 2.
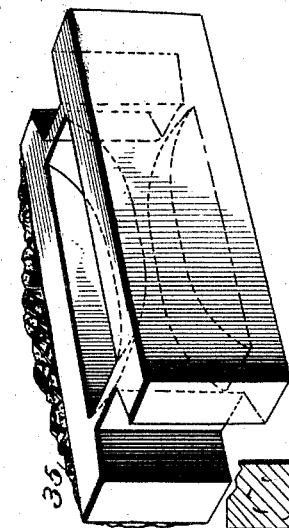
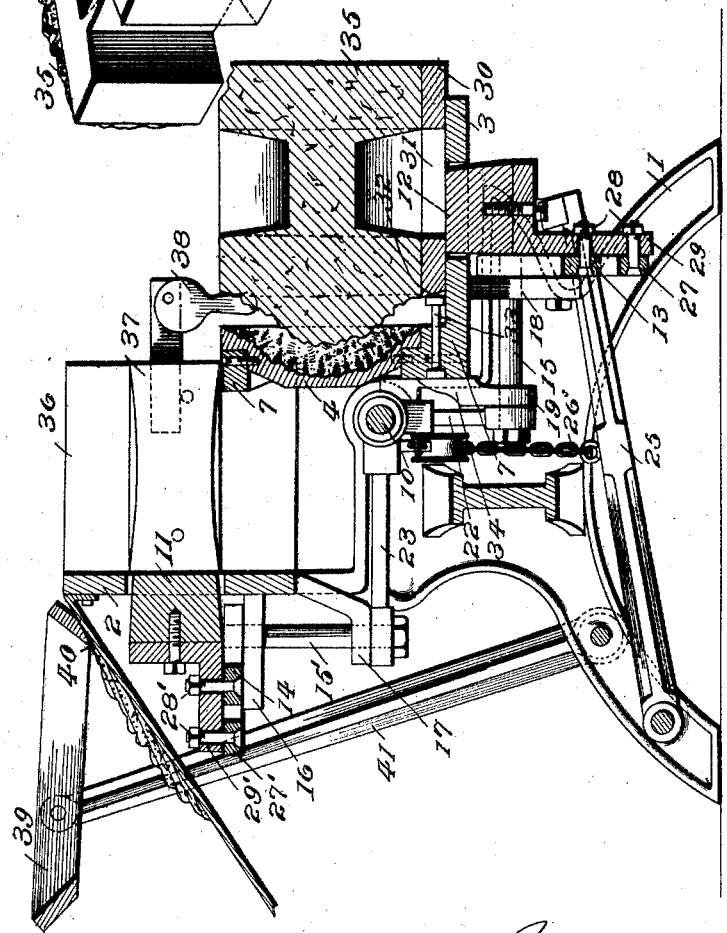
Witnesses
Frederick A. Holton
Wm B. Kerkam
Inventor
John W. Jackson
By
Mauro, Cameron, Lewis & Massie,
Attorneys.

No. 776,137. PATENTED NOV. 29, 1904.
J. W. JACKSON.
MACHINE FOR MOLDING BUILDING BLOCKS.
APPLICATION FILED AUG. 10, 1904.
NO MODEL. 4 SHEETS—SHEET 3.
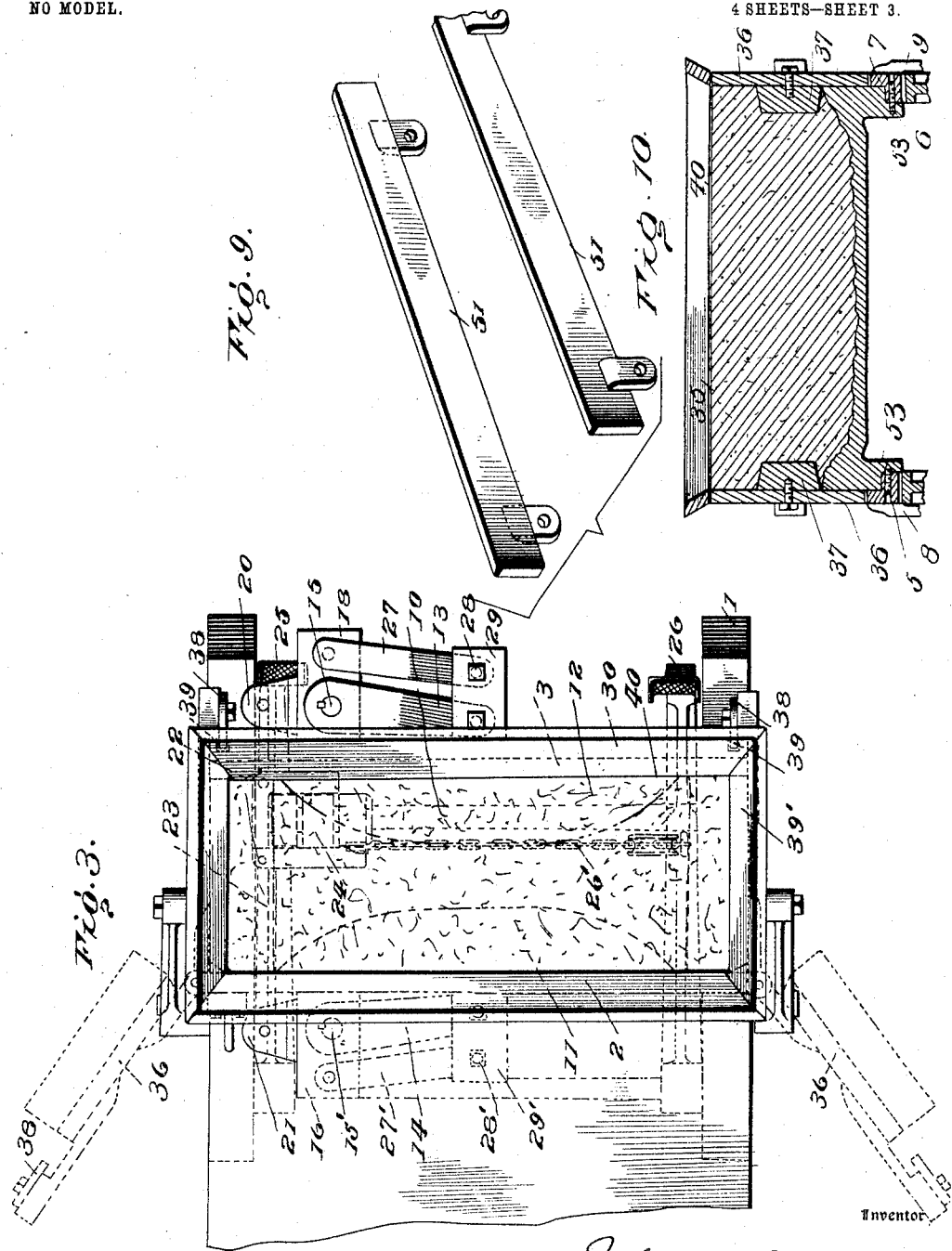

No. 776,137. PATENTED NOV. 29, 1904.
J. W. JACKSON.
MACHINE FOR MOLDING BUILDING BLOCKS.
APPLICATION FILED AUG. 10, 1904.
NO MODEL. 4 SHEETS—SHEET 4.

No. 776,137.

Patented November 29, 1904.

UNITED STATES PATENT OFFICE.

JOHN W. JACKSON, OF RICHMOND, VIRGINIA.

MACHINE FOR MOLDING BUILDING-BLOCKS.

SPECIFICATION forming part of Letters Patent No. 776,137, dated November 29, 1904.

Application filed August 10, 1904. Serial No. 220,225. (No model.)

*To all whom it may concern:*

Be it known that I, JOHN W. JACKSON, of Richmond, Virginia, have invented a new and useful Machine for Molding Building-Blocks, which invention is fully set forth in the following specification.

It is the object of this invention to provide a simple and efficient molding-machine for making recessed building-blocks and provide means for the ready removal of the cores from the sides of the block without deforming the block and for automatically separating the face of the block from the bottom of the mold without disfiguring the face.

It is a further object of the invention to provide a molding-machine capable of making blocks of any desired shape or size and capable of being manipulated from one side only, whereby time in manipulation is saved, and also of doing away with cogs and gear-wheels, whereby clogging of the machinery by the plastic material of the blocks may be avoided.

With these objects in view the invention consists of a mold having swinging end walls supported on a fixed side wall, the opposite side wall and bottom of the mold being normally fast to each other and capable of rotating together about a common axis. The swinging end walls are provided with fixed cores which project into the mold when the latter is closed, while the side walls are provided with movable cores which are adapted to be simultaneously operated by foot-actuated means. The core in the front wall is capable of moving with said wall about the common axis and can be manipulated without interfering with the movement of the side wall. Automatic means are also provided for separating the face of the block from the bottom of the mold as the latter swings into a vertical plane. To remove the excess of material from the top of the mold, a pivotally-supported hopper is provided, which is adapted to slide over the edges of the mold and take with it the excess of material.

The invention also consists in the novel construction and arrangements of parts herein described, and set forth in the claims.

The inventive idea involved may receive various mechanical expressions. For the purpose of illustrating the invention reference is had to the accompanying drawings, which show one form which the invention may assume.

Figure 8:
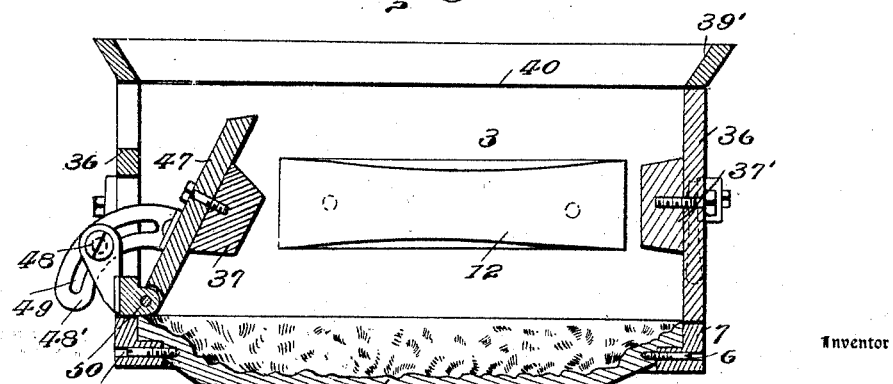

Figure 1 is in part an elevation and in part a central transverse vertical section of the molding-machine. Fig. 2 is a similar sectional view to Fig. 1, but shows the hopper thrown back and the front of the mold turned down. Fig. 3 is a plan view of the device with the ends of the mold swung back, as shown in dotted lines. Fig. 4 is a vertical longitudinal section taken on the line 4 4 of Fig. 1. Figs. 5 and 6 show side plates for the mold, the latter being provided with a division-plate. Fig. 7 is a perspective view of the finished block. Fig. 8 shows a mold in vertical longitudinal section and provided with an adjustable end wall. Fig. 9 is a view in perspective of side plates for the top of the mold; and Fig. 10 is a view of a modification of the bottom plate 4, showing the same in vertical section.

Referring to Figs. 1, 3, and 4, 1 is the frame of the machine for supporting the mold. 2 is the back wall of the mold and is fast to the frame 1. 3 is the front wall, which carries the bottom 4, which latter is preferably in the form of a plate adapted to be attached, by means of screws 5 and 6, to a suitable frame 7, fast to wall 3, and can be readily replaced by others when it is desired to give the face of the block a different contour. The front wall 3, with the bottom 4 carried thereby, is supported by brackets 8 9, Fig. 4, which are revolubly supported on a shaft 10, extending lengthwise of the mold, which latter has its support in the frame of the machine.

Extending through walls 2 and 3 are two cores 11 and 12, which are capable of being moved in and out of the mold and for this purpose are mounted on the extremities of two levers 13 and 14, respectively. Each of these levers is fast to the end of a vertical shaft 15 15', held in position on each side of the mold by suitable supports, which in the case of shaft 15' are members 16 and 17, fast to the frame and body of the mold, while in the case of shaft 15 they are members 18 and 19, carried by the front wall of the mold. To the bottom of each shaft 15 15' is secured a crank-arm 20 21, and at the extremity of each of these arms is pivotally attached a rod 22 23, connecting with a collar 24, mounted to slide on shaft 10 by means of suitable foot-actuated levers 25 26 and chain 26'. By sliding collar 24 on the shaft 10 the arms 22 23 are caused to move, thereby turning crank-arms 20 21 and causing the ends of the levers 13 and 14 to move the cores 11 and 12 in and out of the mold. In order to give a parallel movement of the cores while withdrawing them from the mold, parallel levers 27 27' are provided to oscillate with levers 13 and 14 and suitably pivoted on bolts 28 28', passing through the core-supports 29 29'. In order that rod 22, which actuates the core 12 on the movable side 3, may not interfere with such movement of the side wall, its extremity is suitably journaled on the shaft 10 and is therefore capable of two movements, one sliding with the collar 24 and another of rotation about the shaft 10, thereby permitting the reciprocation of the core 12 in any position of the front wall 3. Against the front wall 3 is placed a plate 30, provided with an opening 31, through which the core is enabled to pass. The lower edge of this plate is preferably beveled at 32 and opposite a pin 33, capable of longitudinal movement and provided with suitable heads to prevent it from dropping out. When the front wall 3 of the mold is rotated about shaft 10 into a horizontal position, as shown in Fig. 2, and the core 12 is withdrawn flush with the inner surface of plate 3, the pin 33 strikes against the projecting part 34 of the frame and causes the plate 30 to slide on plate 3 and away from the bottom 4 of the mold, thereby separating the face of the molded block 35 from the bottom of the mold in lines normal to the bottom and preventing disfiguration of the molded surface.

The ends 36 of the mold are preferably hinged to the fixed wall 2 and carry detachable cores 37, which may be readily replaced by others of different form or size. Suitable means for locking the end walls to the mold are provided, such as by cams 38, pivoted on projections of the wall and entering a groove 39 in the side wall of the mold.

Normally resting on the top of the mold is a hopper 39, having a beveled scraping edge 40. This hopper is carried by two parallel arms 41 42, the lower extremities of which are pivotally supported on the frame of the machine, while the upper extremities are similarly attached to the hopper-body.

The operation of the device as thus far described is as follows: The bottom plate 4, which forms the bottom of the mold, is secured in position. The sides of the mold are swung together and fastened by means of the cam devices 38. Hopper 30 is then swung to rest on top of the mold, and the core-pieces are swung out of the mold until the inner ends are flush with the inside walls of the mold. This is done by depressing the lever 26. The plastic material is then filled into the mold up to the lower level of the cores, tamped, and then the cores introduced into the mold by manipulating lever 25. The remainder of the plastic material is introduced and then the excess removed by sliding the hopper 39 to a position back of the mold and resting upon the inclined board 52. In order to remove the molded block from the mold, the side cores 11 and 12 are withdrawn by depressing the lever 26. The two end walls 36 36, carrying the fixed cores, are then swung to one side, and finally the front side together with the bottom 4 are rotated upon shaft 10 until the front wall of the mold assumes a horizontal position. Just before reaching this position the pin 33 engages the side of the mold at 34, thereby pushing plate 30, carrying the molded block 35, away from the bottom of the mold 4. This horizontal movement of the block away from the surface of the bottom of plate 4 enables the face of the block to be kept in a perfect condition. The block is then ready to be taken to any suitable place and dried.

The form of block which is produced is shown in Fig. 7 with the side and end recesses and the face 35, which corresponds to the bottom of the mold. This mold may be readily adapted to the manufacture of halves and quarter-blocks, and in order to effect this result the face-plate 30, which is used in making full blocks, is replaced by plate 42, which is provided with an opening 43, similar to that of the face-place 30, and in addition a divided plate 44, which is provided with recesses 45, permitting of the introduction of the core through the opening 43 and into these recesses. The operation of the device in this instance is similar to that described in making a whole block.

It is sometimes desirable to manufacture blocks of octagonal or other shapes and blocks which may have sides inclined at various angles in order to suit various conditions of construction. In Fig. 8 is illustrated a form of the invention for this purpose. The end wall of the mold is supported on the fixed wall by means of hinges or other suitable means, such as previously described, and also has a pivotal support which will enable it to assume any desired angle with respect to the bottom of the mold. As illustrated, the end wall 47 is pivotally supported on the bottom of a frame 36 and secured in position by any fastening device, such as a slotted plate 48' and a screw 48, passing through a slot 49. The frame itself is supported by hinges (not shown) attached to the end wall, as heretofore described. This construction permits the wall 47, forming the end of the mold, to be swung outward and also to be inclined at any desired angle for the purpose of making octagons or other blocks having sides inclined at any desired angle.

In Fig. 9 is shown side pieces 51, which may be supported on the tops of the walls when it is desired to make blocks of increased depth, while in Fig. 10 the bottom plate 4 is provided with lugs 53, extending downward and adapted to raise the bottom of the mold, thereby enabling slabs or thin blocks to be made.

It will be seen that this molding-machine can be manipulated from one side only, and the parts of the machine are within ready reach of the operator, thereby saving time in the manipulation of the machine. As another advantage of this device the blocks are molded face down, thereby securing a better surface to the finished block by reason of the increased pressure of the material. The blocks may also be provided with a facing of different material by introducing such material first into the bottom of the mold and then filling the remaining space with the backing material. Cores of various sizes may be substituted, and in cases where the division-plate is employed instead of a single core on each side of the mold double cores may be substituted, each adapted to enter the mold on each side of the mold-plate, in which case the division-plate may be made solid instead of recessed.

Having thus described my invention, what is claimed is—

1. In a molding-machine, the combination of a fixed side wall, an opposing movable side wall having the bottom of the mold connected thereto, oppositely-disposed side cores, and means for reciprocating the same through said side walls.

2. In a molding-machine, the combination of a fixed side wall, an opposing revoluble side wall, oppositely-disposed side cores, and means for reciprocating the same through said side walls.

3. In a molding-machine, the combination of a fixed side wall, an opposing side wall revolubly supported and having the bottom of the mold connected thereto, oppositely-disposed side cores, and means for reciprocating the same through said side walls.

4. In a molding-machine, oppositely-disposed side cores, and means for simultaneously reciprocating the same through the side walls of the mold.

5. In a molding-machine, the combination of a fixed side wall, an opposing side wall having the bottom of the mold connected thereto, a shaft for revolubly supporting said side wall and bottom, side cores, and means on said shaft for reciprocating the cores through said side walls independently of the position of the revoluble side wall.

6. In a molding-machine, the combination of a fixed side wall, an opposing side wall, a shaft for revolubly supporting the latter, a side core revolubly mounted on said shaft and movable with said side wall, and means for reciprocating said core through said side wall.

7. In a molding-machine, the combination of a fixed side wall, an opposing side wall, a shaft for revolubly supporting the latter, a side core revolubly mounted on said shaft and revoluble with said side wall, a second core adapted to pass through the fixed side, and means for simultaneously reciprocating said cores through said side walls.

8. In a molding-machine, the combination of a fixed side wall, an opposing side wall, a shaft for revolubly supporting the latter, a side core revolubly mounted in said shaft and revoluble with said side wall, a second core adapted to pass through the fixed side and connected with said shaft, a collar on the shaft, and means for sliding the collar on the shaft whereby said cores are reciprocated through the said side walls of the mold.

9. In a molding-machine, the combination of a fixed vertical side wall, an opposing side wall revolubly supported and having the bottom of the mold fast thereto and movable with said wall, end walls revolubly supported on said fixed wall, and adjusting means carried with said movable end wall whereby said wall may be inclined at various angles to the bottom of the mold.

10. In a molding-machine, the combination of a fixed side wall, an opposing side wall revolubly supported and having the bottom of the mold attached thereto, a plate resting against said movable side, and means for automatically thrusting the plate and the molded block carried thereon away from the bottom of the mold as the latter moves into a vertical position.

11. In a molding-machine, a frame, a vertical side wall fast to said frame, end walls, supports for the same hinged to said side wall, means on said supports for adjusting the inclination of the said end wall or walls to the bottom of the mold whereby the mold may be adapted for making blocks with ends differently inclined.

12. In a molding-machine, a mold having a vertical side wall, a hopper normally resting on the top of the mold and slidable over said wall, and having swinging pivotal supports eccentrically located relative to the center of the hopper, whereby the front edge of the hopper rests on and scrapes the top of the mold in passing over the same.

13. In a molding-machine, the combination of a side wall revolubly supported, an opposite fixed side wall, end walls hinged thereto and provided with fixed cores, means for adjusting the inclination of the end wall or walls whereby the end or ends of the block may be made at any desired angle, said side walls provided with core-openings, and cores adapted to reciprocate through said openings.

14. In a molding-machine, a mold provided with movable side cores, and a plate having openings therein adapted to receive the side cores and carrying a division-plate for dividing the mold into compartments.

15. In a mold the side walls of which are provided with openings, a plate resting against one of said side walls and having an opening therein to correspond to the opening in the wall, a division-plate provided with recesses at its ends and fast to said plate, and cores adapted to be inserted through said walls and into said recesses.

16. In a molding-machine, the combination of a frame, a mold on the frame and having a side wall fast to the frame, an opposite side wall having the bottom of the mold attached thereto, a shaft supported by the frame, means for revolubly supporting said side wall and bottom of the shaft, said side walls being provided with openings, cores fitting said openings, levers supporting said cores, and foot-operated means on said shaft for simultaneously actuating said levers whereby the cores may be introduced or withdrawn from said mold.

17. In a molding-machine, a mold having vertical side walls, end walls intermediate the side walls, a frame supported by the mold, and means on the frame for adjusting the inclination of the end walls to the bottom of the mold.

In testimony whereof I have signed this specification in the presence of two subscribing witnesses.

JOHN W. JACKSON.

Witnesses:
   C. T. BROWN,
   S. L. LACY.